US006241064B1

(12) United States Patent
Hierzer

(10) Patent No.: US 6,241,064 B1
(45) Date of Patent: Jun. 5, 2001

(54) FITTING, CONDUCTOR RAIL AND COUPLING DEVICE

(76) Inventor: Andreas Hierzer, Auer-Welsbachgasse 34, A-8055 Graz (AT)

( * ) Notice: Subject to any disclaimer, the term of this patent is extended or adjusted under 35 U.S.C. 154(b) by 0 days.

(21) Appl. No.: 09/339,600

(22) Filed: Jun. 24, 1999

(51) Int. Cl.[7] .......... B60M 1/34

(52) U.S. Cl. .......... 191/22 R; 191/33 R; 191/23 R; 339/75 R; 339/91 R; 439/116; 439/261

(58) Field of Search .......... 191/22 R, 33 R, 191/23 R; 339/22 B, 75 R, 21 R, 91 R; 439/116, 261, 372, 350

(56) References Cited

U.S. PATENT DOCUMENTS

| | | | | |
|---|---|---|---|---|
| 2,076,558 | * | 4/1937 | Hartman et al. | 191/23 R |
| 2,105,833 | * | 1/1938 | Feuer et al. | 247/3 |
| 3,824,522 | * | 7/1974 | Bertrams | 339/21 R |
| 3,848,714 | * | 11/1974 | Claxton et al. | 191/33 |
| 4,137,424 | * | 1/1979 | Hesse et al. | 174/97 |
| 4,173,382 | | 11/1979 | Booty | 339/22 |
| 5,065,295 | | 11/1991 | De La Haye et al. | 362/391 |
| 5,373,926 | * | 12/1994 | Clarke et al. | 191/23 R |

FOREIGN PATENT DOCUMENTS

| | | | |
|---|---|---|---|
| 3919201 | 12/1990 | (DE) . | |
| 4410811 | 10/1994 | (DE) . | |
| 19641090 | 4/1997 | (DE) | H01R/25/14 |
| 0320661 | 6/1989 | (EP) . | |
| 0495696 | 7/1992 | (EP) . | |
| 0528774 | 2/1993 | (EP) | B41F/23/08 |
| 0541428 | 5/1993 | (EP) . | |
| 0798819 | 10/1997 | (EP) | H01R/25/14 |
| 2176811 | 11/1973 | (FR) | H02G/5/04 |

* cited by examiner

*Primary Examiner*—S. Joseph Morano
*Assistant Examiner*—Frantz F. Jules
(74) *Attorney, Agent, or Firm*—Ladas & Parry

(57) ABSTRACT

Disclosed are a fitting, a conductor rail and a conductor rail coupling device for supplying current to lighting fixtures via conductors insulatedly arranged in the conductor rail; the fitting comprises a housing formed of a first and a second housing part which are articulately interconnected and are capable of being mounted on the conductor rail, the two housing parts being adapted to be releasably closed about the conductor rail when the housing is mounted on the conductor rail, and electrical contact elements adapted to contact the conductors through openings of the conductor rail when the housing is mounted on the conductor rail, the electrical contact elements being arranged on only the first one of the housing parts, on one side of the conductor rail; in corresponding manner, the conductor rail of oval cross-section has longitudinal grooves on only one longitudinal side in which the conductors are inserted by aid of slit insulating sections and held therein; on the opposite side, a profiled groove is provided to receive a coupling piece of the coupling device.

16 Claims, 2 Drawing Sheets

FIG. 1
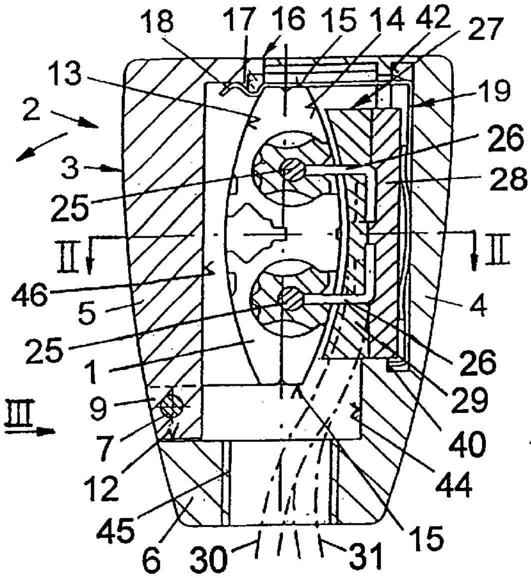
FIG. 3
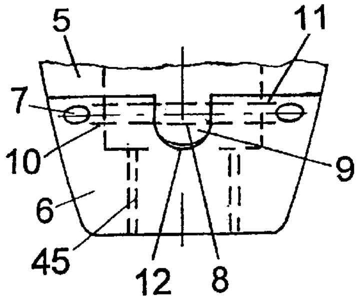
FIG. 5
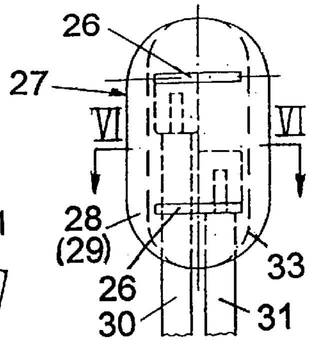
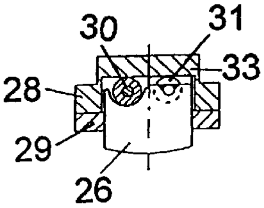
FIG. 6
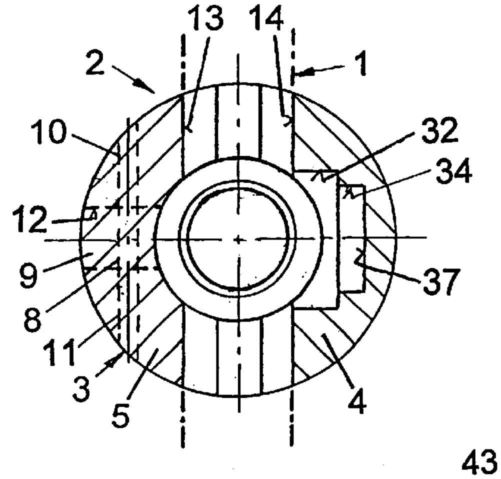
FIG. 2
FIG. 7
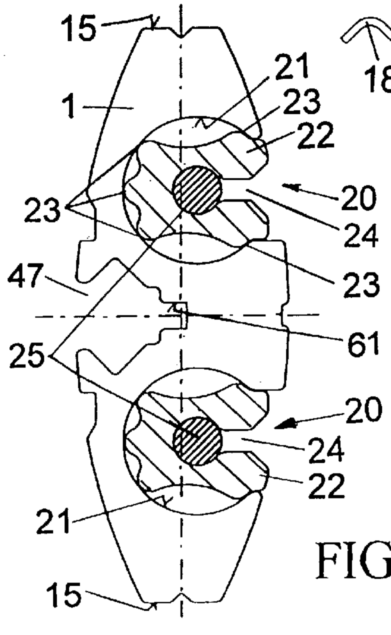
FIG. 4
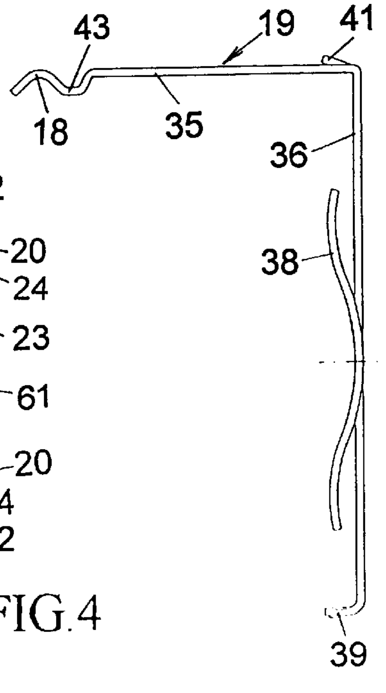
FIG. 8
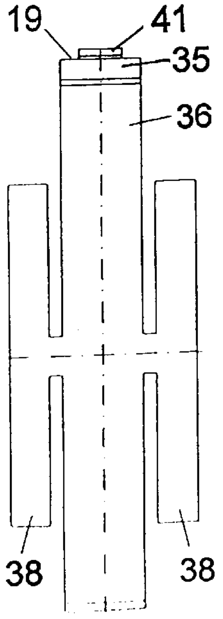

FITTING, CONDUCTOR RAIL AND COUPLING DEVICE

FIELD OF THE INVENTION

The invention relates to a fitting for an electrically conducting conductor rail, for supplying electrical power to lamps etc., where the fitting comprises a housing capable of being mounted on the conductor rail and electric contact elements which contact electrical conductors of the rail when the housing is mounted on the conductor rail.

Furthermore, the invention relates to a conductor rail to be used with such a fitting, as well as to a coupling device for connecting such conductor rails.

BACKGROUND OF THE INVENTION

From EP 495 696 A1, a fitting of the type discussed here for a flat conductor rail is known, wherein two electrical conductors are attached to the two flat sides of the rail and are separated from each other by a thin, strip-like insulating web. The housing of the fitting is comprised of two separate housing parts made of an insulating material, the parts being held together by two spring clips provided on opposite sides thereof. In both housing parts, resilient contacts are arranged which contact the conductors and which are connected to connecting cables laterally led out of the housing parts. Attachment of these two spring clips is cumbersome insofar as for this purpose the two housing parts must be held in position and held tightly against slipping off, so that at least for this two hands are required. Moreover, the two spring clips can be mounted only one after the other, thus also requiring separate manipulations.

Furthermore, from DE 39 19 201 A, a power supply for lighting fixtures is known which comprises a conductor rail and fittings which are associated with the lighting fixtures and which are to be fastened to the conductor rail. The conductor rail in that instance consists of two square metal sections interconnected by means of insulators arranged in spaced relationship in blind holes, the insulators simultaneously serving for the attachment of suspending devices. The fitting is designed as a U-shaped housing open on one side and configured like a bow which is insulatingly slipped onto the metal sections from the side; a current is collected via countersunk screws which are screwed therethrough and which contact the metal sections. On the conductor rail, a lighting fixture is attached to which lines are led which are housed in cavities provided in an insulation means of the fitting and which are connected with the screws in a manner not explained in detail. If the conductor rail is under current during mounting or dismounting of this fitting, there is the risk of short circuiting if one of the screws projects and thus conductively bridges the space between the metal sections.

SUMMARY OF THE INVENTION

It is an object of the invention to provide a fitting of the initially defined kind which can be mounted and dismounted quickly and easily without requiring the aid of a tool. Furthermore, safe, risk-free contacting of the conductors is to be effected such that the fitting is also suitable for line voltage feeding means (e.g. 230 V).

A further object of the invention is to provide a conductor rail to be used with such a fitting which allows for such a quick, simple and safe mounting and dismounting of the fitting as well as contacting, and which, moreover, enables a connection to a further conductor rail via a coupling device, also in a quick and simple manner and without requiring the aid of a tool.

Accordingly, the invention, in a first aspect, provides a fitting which comprises a housing formed of a first and a second housing part which are articulately interconnected and are capable of being mounted on said conductor rail, said two housing parts being adapted to be releasably closed about said conductor rail when said housing is mounted on said conductor rail, and electrical contact elements adapted to contact the conductors through openings of said conductor rail when said housing is mounted on said conductor rail, said electrical contact elements being arranged on only the first one of said housing parts, on one side of said conductor rail. By articulately interconnecting the two housing parts, handling of the fitting during mounting and dismounting thereof is substantially simplified. Suitably, the housing part comprising the contact elements is laid onto the conductor rail, and subsequently the housing is closed by pivoting the other housing part thereto. The fitting designed according to the invention thus can simply and safely be mounted to a conductor rail, and it can also be dismounted therefrom rapidly and without any problems, e.g. if changes in the attachment of the individual lights are to be made on a previously installed lighting fixture. In the course of surrounding or enclosing the conductor rail, the conductor rails can also be immediately contacted electrically by means of the contact elements, the latter automatically being pressed into the contacting position when the housing parts are closed.

With a view to a mechanically precise and lasting connection, it is advantageous if the articulately interconnected housing parts are made of metal. Here, further, a ground connection of the metallic housing is possible for safety reasons.

Moreover, for a simple closing of the housing parts it is advantageous if the two articulately interconnected housing parts comprise cooperating means for mutual resilient engagement in their closed state. In this way, the housing parts can be particularly simply put onto the conductor rail when the fitting is mounted, and be closed by latching, i.e. snapping together, about the conductor rail. During mounting, the one housing part need only be pivoted onto the other one with the conductor rail enclosed, and snappingly fixed on the other housing part.

To automatically contact the conductors of the conductor rail when the housing is being closed, it is advantageous if a niche-like cavity is provided in one of the housing parts in which a contact piece including the contact elements is housed. By being accommodated in the niche-like cavity, the contact piece can be retained in the respective housing part without any problems before the fitting is mounted, i.e. it may be pre-mounted without getting lost. For this purpose, optionally also insertion of the contact piece may be effected by snapping in or latching in behind rims of the cavity.

To ensure contacting when making an electrical contact with the conductors in the conductor rail when the fitting has been mounted on the conductor rail, even if the contact elements were to have different lengths due to production tolerances and/or the conductors were to have somewhat different positions in the conductor rail, it is particularly advantageous if a spring element is provided between the bottom of the niche-type cavity and the contact piece, which urges the contact piece against the conductor rail. The spring element may, e.g., be a rubber-elastic body which is attached on the bottom of the niche-type cavity; also several springs may be inserted at spaced intervals from each other, yet for reasons of mounting, as a rule, a single spring element will be preferred; this simplifies also production and stockkeeping. In this respect it has furthermore proven suitable if the spring element has a resilient leg projecting, when mounted, to beyond the conductor rail, the resilient leg including a latching projection snapping into a latching indentation of the oppositely arranged housing part. Thus, one and the same spring element may simultaneously be employed for ensuring electrical contacting as well as for resilient latching engagement of the housing parts, which has additional advantages in terms of production and mounting. To ensure a particularly simple and low-cost production, the spring element preferably is a one-piece punched part having angled resilient legs; the resilient legs urge the contact piece against the conductor rail, on the one hand, so as to press the contact elements against the conductors, and, on the other hand, they provide for the resilient latching of the housing part in the closed position of the housing.

To ensure an easy to make, good insulation of the electrical contacts in the contact piece, it has proven advantageous if the contact piece is a synthetic material body in which the contact elements are arranged as angled contact lugs which are connected with power supply leads.

As such, each one of the two housing parts could have passages for connecting cables or power supply leads so as to supply electric current to the lighting fixtures connected to the respective fittings. For a simple manufacture, for safety reasons as well as for a pleasing appearance of the fitting it is, however, advantageous if merely one of the articulately interconnected housing parts is provided with a bore to pass power supply leads therethrough.

The housing could, as such, consist of two housing halves of practically equal size, interconnected in hinge-like manner; however, to provide more space for the joint connection between the housing parts, and moreover, to provide for better pre-requisites to the unilateral contacting of the conductors of the respective conductor rail, it is particularly advantageous if the one housing part has a base portion extending below the conductor rail when mounted thereon, the other housing part being hinged to that base portion by means of a pin. It may, furthermore, be advantageous for the base portion to have the bore for the power supply lead to be passed therethrough. The bore may particularly be made following the niche-type cavity of the housing part in which the contact piece is to be housed. In this manner, the one housing part which comprises the base portion forms the main part of the housing, whereas the other housing part forms a closing part capable of being pivoted towards or away from the former.

As initially mentioned, it is also an object of the invention to provide a conductor rail particularly suitable to be used with the fitting according to the invention, which conductor rail enables easy contacting of the conductors during closing of the fitting housing about the same, and accordingly, the conductor rail has a generally oval outer contour as well as longitudinal grooves provided on one longitudinal side thereof, in which the conductors or wires are held by aid of laterally open insulating sections. The current rail may be made of a metal material without any problems so as to be sufficiently rigid to function as a carrier for the attachment of lighting fixtures, yet because the conductors are housed by aid of insulating sections, the lighting fixtures may also be fed with a high voltace (e.g. 230 V) , i. e. not merely with a low voltage (12 V, e.g.), and likewise, also the fitting is very well suited to contact the conductors and supply current to the lighting fixtures connected thereto if a voltage of e.g. 230 V is supplied.

For manufacturing purposes it is, moreover, suitable if the longitudinal grooves are formed in the conductor rail by cavities of sector shaped cross-section. The sectors should extend over a central angle of more than 180° so that undercut longitudinal grooves are obtained and the respective conductor is safely held within its insulation section within the longitudinal groove also by positive engagement.

In this connection it has also proven advantageous for attachment of the insulatintg sections including the—bare—conductors within the undercut longitudinal grooves by snapping in or by front-side insertion as well as by a subsequent good fixing, if each of the recesses has an insulating section arranged therein which is supported on the inner wall of the cavity at at least three sites of contact (lines of mechanical contact) and which has a slit to receive the respective conductor or for contacting the same, respectively.

Since the present conductor rails are provided in certain lengths or are cut to certain lengths, respectively, serial arrangement of several conductor rails is required to attain the desired total length of the conductor rail when the latter is being installed. For this purpose, a profiled groove is provided on the other longitudinal side of the conductor rail, for receiving a coupling piece of insulating material for longitudinally interconnecting two conductor rails. In a preferred embodiment of a coupling device for such conductor rails it is thus provided for the coupling piece insertable into the profiled groove of the conductor rail(s) to project on both sides from a central insulating piece which generally is adapted to the outer contour of the conductor rail(s), and from which moreover, section webs depart on its other longitudinal side, which section webs include a slit aligned with the longitudinal grooves of the conductor rail(s), the insulating piece having a central recess between its two section webs so as to receive an insertion part of insulating material in which contact rails are arranged to be inserted in the slits of the section webs. In this manner, both a stable mechanical connection between the two conductor rails and a good electrical connection between the individual conductors can be made.

Since the conductor rails are to be connected to ground potential when being operated with line voltage, it is advantageous when connecting two conductor rails that the coupling piece has a slit in which the insertion part is insertable with a contact rail. In this manner, the two conductor rails can also be safely connected to ground potential.

DESCRIPTION OF THE DRAWINGS

The invention will now be described in more detail by way of a particularly preferred exemplary embodiment illustrated in the drawings to which, however, it shall not be restricted, and wherein:

FIG. 1 shows an axial section of a generally rotationally symmetrical fitting, together with a conductor rail in front view, partly in cross-section;

FIG. 2 shows a cross-section through this fitting, according to line II—II of FIG. 1, the conductor rail being schematically indicated in dot-and-dash lines;

FIG. 3 shows a partial view of the fitting according to arrow III of FIG. 1;

FIG. 4 shows a view of the conductor rail only, on a scale enlarged relative to that of FIG. 1, the inserted insulating sections and the conductors being shown in section;

FIG. 5 shows a view of the contact piece provided in the fitting of FIG. 1, viewed from the left-hand side according to the representation of FIG. 1;

FIG. 6 shows this contact piece in a section according to line VI—VI of FIG. 5;

FIG. 7 shows a spring element in a view similar to that of FIG. 1, yet on a scale enlarged relative to the latter;

FIG. 8 shows an associated front view of this spring element;

DETAILED DESCRIPTION

Figure 9:
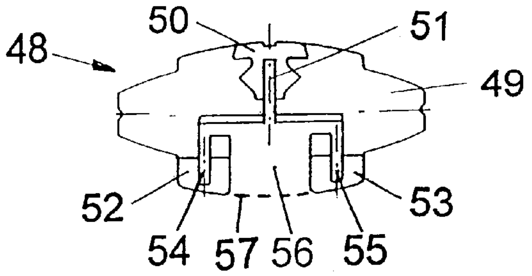
FIG. 9 shows a front view of a two-part coupling device for two conductor rails.

In FIGS. 1 and 2, a metal conductor rail 1 is provided for supplying electric power to lighting fixtures not illustrated, in particular lighting fixtures operated with line voltage (e.g. 230 V), by aid of a fitting generally denoted by 2. The conductor rail 1 has a generally oval contour—viewed in cross-section—and is made of aluminum or an aluminum alloy, e.g.

The fitting 2 has a generally rotationally symmetrical metal housing 3 consisting of two housing parts 4, 5 which, in the closed state illustrated, surround the conductor rail 1 and which are releasably interconnected, as will be explained therebelow in more detail. The housing part 4 abutting the right-hand side of the conductor rail 1 comprises a base portion 6 extending below the conductor rail 1, to which the other housing part 5 abutting the left-hand side of the conductor rail 1 is hinged by means of a pin 7. The pin 7 is mounted, on the one hand, by a press fit in a transverse bore 8 of a projection 9 of the other housing part 5 and, on the other hand, by a clearance fit in bores 10, 11 of the base portion 6, the projection 9 being received in a complementary cavity 12 in the base portion 6, as is particularly visible in FIGS. 2 and 3. In this manner, the other housing part 5 can be pivoted away from the one housing part 4 in the direction of the arrow shown in FIG. 1 (towards the left) about the axis defined by the pin 7, to insert the conductor rail 1 in the housing 3 or between the housing parts 4, 5 thereof, respectively (or to remove it therefrom), the two housing parts 4, 5 having cavities 13, 14 with inner contours which match the oval outer profile of the conductor rail 1. The inner contour of the cavity 14 of the one (first) housing part 4 additionally is adapted to the flattened narrow sides 15 of the conductor rail 1 (cf. also FIG. 4), i.e. the cavity 13 of the other (second) housing part 5 ends at the transition to the narrow side 15 of the conductor rail 1, the two housing parts 4, 5 forming a separation site 16 in the upper region of this transition at which site they flatly abut each other. Adjacent the separation site 16, the other housing part 5 has an undercut portion forming a latching indentation 17 in which an end section of a spring element 19 bent to form a latching projection 18 can be snapped in, which spring element is arranged in a housing part 4, as will be explained in more detail further below. Thus, the two housing parts 4, 5 are articulately interconnected via the pin 7 and releasable connected at the separation site 16 by the snap connection constituted by the latching indentation 17 and the latching projection 18, whereby the fitting 2 can be mounted to and dismounted from the conductor rail 1 in a quick and simple manner.

On one of its longitudinal sides, where it abuts a housing part 4, the conductor rail 1 illustrated on an enlarged scale in FIG. 4 has two longitudinal grooves 20 formed by cavities 21 of sector-shaped cross-section. In each one of the cavities 21, an insulating section 22 is arranged which is supported on the inner wall of the cavities 21 on at least three points or lines 23 of contact ("three-point bearing"); in the embodiment of the insulating section 22 illustrated, preferably five points or lines 23 of (mechanical) contact are provided. Each insulating section 22 has a slit 24 oriented towards the opening of the cavity 21 serving to receive a bare, i.e. uninsulated, conductor 25, e.g. a copper wire having a cross-section of 2.5 $mm^2$ onto which contact elements 26 can be pressed which are arranged in a contact piece 27 as will be explained later on in more detail by way of FIGS. 1, 4 and 5. The insulating sections 22—together with the previously inserted conductors 25—may be inserted into the cavity 21 lengthwise, or they may simply be snapped into the cavity 21 by a transverse movement.

As particularly apparent from FIGS. 1 and 6, the contact piece 27 is comprised of two elongate insulating platelets 28, 29 rounded at their ends and interconnected e.g. by gluing. Between the insulating platelets 28, 29, the contact elements 26 designed as angled contact lugs are arranged, which are connected with connecting cables or leads 30, 31, e.g. by soldering, corresponding recesses, of course, being provided in the insulating platelets 28, 29 to receive the contact elements 26 and the connecting cables 30, 31 between the insulating platelets 28, 29.

With both, its one insulating platelet 29 facing the conductor rail 1 and its other insulating platelet 28, the contact piece 27 is inserted in a niche-like cavity 32 (cf. FIG. 2) of the first housing part 4 so as to be displaceable transversely to the conductor rail 1. The rear portion 33 of the other insulating platelet 28 is designed to be narrower and is received in a stepped deepening 34 (cf. FIG. 2) provided in the bottom of the cavity 32 (for a better general view, the contact piece 27 is not illustrated in FIG. 2).

In the deepening 34, the above-mentioned spring element 19 is arranged behind the other insulating platelet 28, the spring element 19 being illustrated in an enlarged representation in FIGS. 7 and 8 and which is designed as a one-piece punch part having resilient legs 35, 36 bent towards each other at right angles, one resilient leg 35 comprising the above-mentioned snapping engagement end portion 18. The other resilient leg 36 contacts the bottom 37 of the deepening 34 of the one housing part 4 and has two resilient bows 38 connected on both sides and of bent design, which are supported on the rear side of the contact piece 27 or of the other insulating platelet 28, respectively, to resiliently urge the contact piece 27 and its contact element 26, respectively, towards the conductor 25 in the conductor rail 1.

To provide support for the spring element 19 in one housing part 4, the lower end portion 39 of the resilient leg 36 is angularly designed so as to be supported on a lower undercut portion 40 of the deepening 34, on the one hand, and at the transition between the two resilient legs 35, 36, a projecting lug 41 is punched and bent outwardly, which is supported on an upper undercut portion 42 of the deepening 34.

As is furthermore apparent from FIG. 7, the one resilient leg 35 has an additional offset portion 43 in front of the offset latching portion 18, which offset portion 43 serves to latch on the conductor rail 1 (cf. FIG. 1), an electrical connection thus being formed between the housing 3 of the fitting 2 and the conductor rail 1 to provide the fitting 2 with a perfect connection to ground.

According to FIGS. 1 and 2, the connecting cables 31 are led out of the housing 3 of the fitting 2 via a bore 44 and a threading bore 45 following thereupon where it is possible (to screw on a cable protecting tube) in the base portion 6 of the one housing part 4, the bore 44 continuing into a cavity 46 of circular-arc-shaped cross-section in the other housing part 5 as far as to the region of the undercut portion 17.

Assembly of the individual parts of the fitting 2 or mounting of the same to the conductor rail 1 is effected such that the housing parts 4, 5 are pivoted apart, whereupon the angled end portion 39 of the spring element 19 is inserted into the lower undercut portion 40 of the deepening 34 of the one housing part 4 and the spring element 19 is pressed towards the bottom 37 of the deepening 34 until the projecting lug 41 of the spring element 19 snaps into the upper undercut portion 42. Subsequently, the contact piece 27 is inserted into the cavity 32 of the one housing part 4, provided that the connecting cables 30, 31 have previously been led out of the fitting 2 through the bores 44, 45; then the fitting 2 is put into contact with the conductor rail 1 with one housing part 4, and the contact elements 26 are pressed into the slits 24 of the insulating sections 22 of the conductor rail 1 until contact has been made with the conductors 25. Then the other housing part 5 is pivoted towards the conductor rail 1 until the latching projection 18 of the spring element 19 has latched in the undercut portion 17 of the other housing part 5, mounting of the fitting 2 thus being complete.

When dismounting the fitting, the sequence is reversed.

As is particularly apparent from FIG. 4, the conductor rail 1 at its center may have a profiled groove 47 on its longitudinal side facing away from the contact piece 27 (FIG. 1), which profiled groove serves to couple to each other two such conductor rails in mutual longitudinal alignment by aid of a correspondingly profiled coupling piece (not illustrated in FIG. 4), which will be inserted into the profiled groove 47 of this conductor rail 1.

Figure 10:
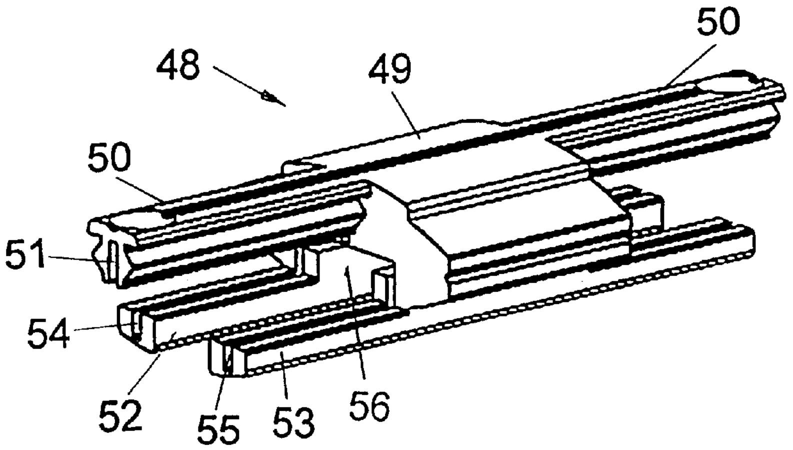
FIG. 10 shows a perspective view of the one part of the coupling device according to FIG. 9.
Figure 11:
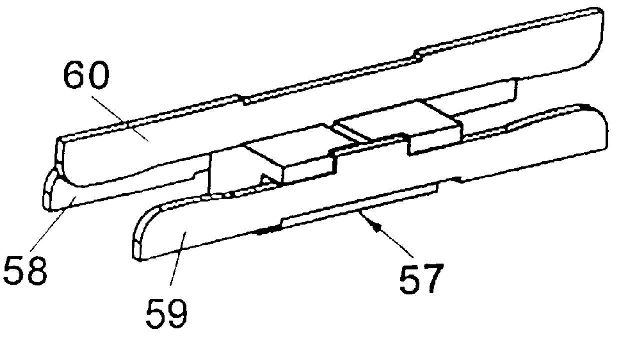
FIG. 11 is a perspective view of the other part, an insertion part, for the coupling device according to FIGS. 9 and 10.

FIGS. 9 to 11 illustrate a coupling device 48 for mechanically and electrically connecting two conductor rails 1, which has a central insulating part 49 the outer shape of which is generally adapted to the outer contour of the conductor rail 1. From the insulating piece 49, a coupling piece 50 projects which has the form of sectional webs having a section complementary to the profiled groove 47 of the conductor rail 1, and including a slit 51. Furthermore, on the other longitudinal side of the insulating piece 49, opposite the coupling piece 50, sectional webs 52, 53 project on either side thereof, each including a slit 54, 55 in alignment with the longitudinal grooves 20 of the conductor rail 1.

The insulating part 49 moreover has a central cavity 56 between the two sectional webs 52, 53 which serves to receive an insertion part 57 of insulating material (cf. also FIG. 11), on which electrically conducting contact rails 58, 59 are arranged which are insertable into the slits 54, 55 of the sectional webs 52, 53 to electrically connect the corresponding conductors 25 of two conductor rails 1 to be interconnected. On the side of the insertion part 57 facing the slit 51 of the coupling piece 50, a further contact rail 60 is arranged which is insertable into the slit 51 of the coupling piece 50 to provide an electrical ground contact between the two conductor rails 1 to be connected, an additional groove 61 being formed for this purpose on the base of the profiled groove 47 of the conductor rails 1 (cf. FIG. 4) into which the contact rail 60 is insertable.

What is claimed is:

1. A fitting in combination with a conductor rail for supplying current to lighting fixtures, said conductor rail having cavities and including insulated conductors, said fitting comprising:

a housing formed of a first housing part and a second housing part directly articulately connected to the first housing part, said two housing parts being adapted to be releasably closed around said conductor rail for mounting said housing on said conductor rail, wherein said two articulately interconnected housing parts comprise cooperating means for mutual resilient engagement in their closed state, and electrical contact elements adapted to contact the conductors through openings of said conductor rail when said housing is mounted on said conductor rail, said electrical contact elements being arranged on only the first one of said housing parts, on one side of said conductor rail.

2. A fitting as set forth in claim 1, wherein said two articulately interconnected housing parts are made of metal.

3. A fitting as set forth in claim 2, wherein said first one of said two articulately interconnected housing parts has a base portion extending below said conductor rail when said housing is mounted, said second one of said two articulately interconnected housing parts being hinged to said base portion.

4. A fitting as set forth in claim 1, wherein said first one of said two articulately interconnected housing parts has a niche-like cavity, said fitting further comprising a contact piece including said electrical contact elements, said contact piece being arranged in said niche-like cavity in said one housing part.

5. A fitting as set forth in claim 4, further comprising a spring element provided within said niche-like cavity and beneath said contact piece so as to urge said contact piece against said conductor rail.

6. A fitting as set forth in claim 5, wherein said spring element has a resilient leg including a latching projection, said resilient leg extending to beyond said conductor rail when said spring element is mounted, said second housing part including a latching indentation, said latching projection of said resilient leg being adapted to resiliently engage in said latching indentation of said second housing part.

7. A fitting as set forth in claim 6, wherein said spring element is a one-piece punched part having angled resilient legs.

8. A fitting as set forth in claim 4, wherein said contact piece is a synthetic material body, said electrical contact elements provided in said contact body being angled contact lugs, said fitting further comprising power supply leads connected to said contact lugs.

9. A fitting as set forth in claim 1, wherein only one of said two articulately interconnected housing parts has a bore so as to provide a passage for power supply leads.

10. A fitting as set forth in claim 9, wherein said first one of said two articulately interconnected housing parts has a base portion extending below said conductor rail when said housing is mounted, said second one of said two articulately interconnected housing parts being hinged to said base portion, and wherein said bore for the power supply leads is provided in said base portion.

11. A conductor rail to be used with the fitting set forth in any one of claims 1 to 10, wherein said conductor rail includes conductors and has a substantially oval outer contour, longitudinal grooves being provided in only one longitudinal side of said conductor rail, and insulating sections being provided in said longitudinal grooves so as to retain said conductors therein, said insulating sections having a longitudinally extending, slit-like opening.

12. A conductor rail as set forth in claim 11, wherein said longitudinal grooves in said conductor rail are formed by cavities of sector-shaped cross-section.

13. A conductor rail as set forth in claim 12, wherein one respective insulating section is arranged in each of said cavities of sector-shaped cross-section, said insulating section being supported within the respective cavity on at least three sites, said insulating section having a slit to receive a respective conductor therein and to enable contacting of said conductor received in said insulating section.

14. A conductor rail as set forth in claim 11, further comprising a coupling piece of insulating material, the longitudinal side of said conductor rail opposing said one longitudinal side having a profiled groove to receive said coupling piece of insulating material therein so as to longitudinally interconnect two conductor rails.

15. A coupling device to be used with at least one of the conductor rails set forth in claim 14, said coupling device comprising a coupling piece, an insulating piece centrally arranged on said coupling piece, said coupling piece thus projecting on both sides from said centrally arranged insulating piece, and an insertion part made of insulating material with electrically conducting contact rails arranged thereon, said insulating piece having a shape substantially matching that of said at least one conductor rail and including sectional webs departing from both sides of said insulating piece on the other longitudinal side of the insulating piece, the sectional webs each having a slit in alignment with the longitudinal grooves of said at least one conductor rail, said insulating piece including a central recess provided between said two sectional webs to accommodate said insertion part of insulating material therein, said contact rails provided on said insertion part being provided to be inserted in said slits of said sectional webs, said coupling piece being insertable in the profiled groove of said conductor rail.

16. A coupling device as set forth in claim 15, wherein said insertion part has a further contact rail and said coupling piece has a slit into which said contact rail is insertable.

* * * * *